United States Patent
Chigusa et al.

(10) Patent No.: US 7,202,594 B2
(45) Date of Patent: Apr. 10, 2007

(54) DISPLAY DEVICE PANEL WITH AN EMITTING FLUORESCENT FILM COMPOSED OF RED FLUORESCENT PARTICLES COVERED WITH A RED PIGMENT

(75) Inventors: Hisashi Chigusa, Tokyo (JP); Keisuke Iida, Tokyo (JP); Hidemi Matsuda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 112 days.

(21) Appl. No.: 11/159,123

(22) Filed: Jun. 23, 2005

(65) Prior Publication Data

US 2005/0236966 A1   Oct. 27, 2005

Related U.S. Application Data

(63) Continuation of application No. PCT/JP03/16962, filed on Dec. 26, 2003.

(30) Foreign Application Priority Data

Dec. 26, 2002   (JP) .............................. 2002-378446

(51) Int. Cl.
  *H01J 29/10* (2006.01)
  *H01J 29/20* (2006.01)
  *H01J 29/26* (2006.01)
(52) U.S. Cl. ..................... 313/467; 313/461; 313/468
(58) Field of Classification Search ........ 313/467–469, 313/461, 485–487
   See application file for complete search history.

(56) References Cited

FOREIGN PATENT DOCUMENTS

| EP | 491406 A1 | * | 6/1992 |
|---|---|---|---|
| EP | 0529098 A1 | | 3/1993 |
| GB | 2093269 A | | 8/1982 |
| JP | 52-14587 | | 4/1977 |
| JP | 53014682 A | * | 2/1978 |
| JP | 53-53958 | | 5/1978 |
| JP | 56-000875 A | | 1/1981 |
| JP | 05025477 A | * | 2/1993 |
| JP | 05035686 A | * | 2/1993 |
| JP | 06-052807 A | | 2/1994 |
| JP | 06-275209 A | | 9/1994 |
| JP | 08-325569 A | | 12/1996 |
| JP | 09-027284 A | | 1/1997 |
| JP | 10-112266 A | | 4/1998 |
| JP | 11-204056 A | | 7/1999 |

OTHER PUBLICATIONS

International Search Report dated Feb. 17, 2004 for Appln. No. PCT/JP03/16962.

* cited by examiner

*Primary Examiner*—Mariceli Santiago
(74) *Attorney, Agent, or Firm*—Pillsbury Winthrop Shaw Pittman, LLP

(57) ABSTRACT

A display device which includes, a display panel, a red emitting fluorescent film, a green emitting fluorescent film, and a blue emitting fluorescent film, each of the fluorescent films being formed on an inner surface of the display panel. The red emitting fluorescent film contains red fluorescent particles having an average particle diameter ranging from 6 to 12 μm and covered with red pigment having an average particle diameter ranging from $\frac{1}{100}$ to $\frac{1}{10}$ of the average particle diameter of the red fluorescent particles, the red emitting fluorescent particles are formed of $Y_2O_2S:Eu$, a concentration of Eu in the red emitting fluorescent film is 60 ppm or less, and the x-value of luminescent chromaticity of the red emitting fluorescent film is not less than 0.620.

11 Claims, 1 Drawing Sheet

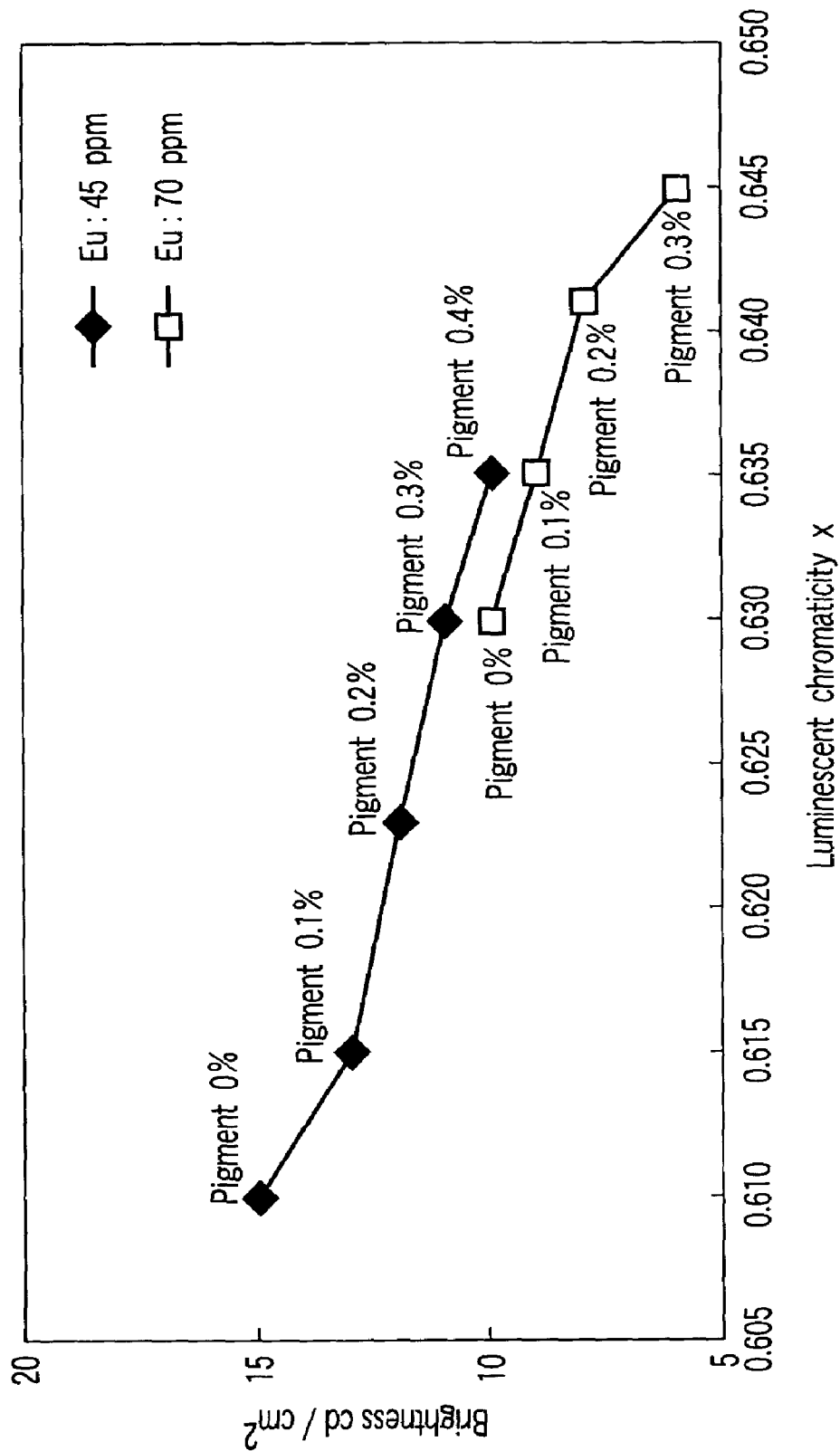
FIGURE

DISPLAY DEVICE PANEL WITH AN EMITTING FLUORESCENT FILM COMPOSED OF RED FLUORESCENT PARTICLES COVERED WITH A RED PIGMENT

CROSS-REFERENCE TO RELATED APPLICATIONS

This is a Continuation Application of PCT Application No. PCT/JP03/16962, filed Dec. 26, 2003, which was published under PCT Article 21(2) in Japanese.

This application is based upon and claims the benefit of priority from prior Japanese Patent Application No. 2002-378446, filed Dec. 26, 2002, the entire contents of which are incorporated herein by reference.

BACKGROUND OF THE INVENTION

1. Field of the Invention

This invention relates to a display device comprising three fluorescent color layers, i.e. red, blue and green layers, on the inner surface of the display panel thereof.

2. Description of the Related Art

In recent years, there have been proposed various methods for improving the contrast of display devices such as a color cathode-ray tube, etc. For example, JP Laid-open Patent Publications (Kokai) No. 6-275209 (1994) and No. 10-112266 (1998) disclose a method for improving the contrast of display devices wherein the surface of particles of a red fluorescent substance is coated with a red pigment and likewise, the surface of particles of a blue fluorescent substance is coated with a blue pigment.

There is also disclosed, for example in JP Patent Publications No. 52-14587 (1977), JP Laid-open Patent Publications (Kokai) No. 9-27284 (1997) and No. 11-204056 (1999), a method for improving the contrast of display devices, wherein a color filter is interposed between the phosphorous layer and the face plate of display device.

However, the aforementioned method of covering the surface of particles of fluorescent substance with a pigment of the same color as that of the fluorescent substance is accompanied with the problem that since the emission of fluorescent substance is caused to be absorbed by the pigment, degrading the brightness of the display device, it is imperative to limit the quantity of pigment to be adhered to the fluorescent particles. As a result, it is impossible to sufficiently improve the contrast of display devices.

Further, although the aforementioned method of interposing a color filter between the phosphorous layer and the face plate of display device is effective in improving the contrast of display device, there are problems that the manufacturing process is very complicated and hence there are many difficulties in the manufacture of the display device, thus inviting an increase in manufacturing cost.

There is also known a method which is directed to improve the color purity and emission brightness of a red fluorescent substance, this object being realized by increasing the concentration of Eu in a red fluorescent substance (see for example, JP Laid-open Patent Publications (Kokai) No. 6-52807 (1994)). This method however is accompanied with a problem that since a large amount of Eu which is expensive is required to be employed, the manufacturing cost of display device would be increased.

The present invention has been accomplished in view of the aforementioned problems and hence one of the objects of the present invention is to provide a display device which is improved in the contrast thereof while making it possible, while making use of the same manufacturing process as conventionally employed, to maintain the luminance brightness of the display device.

BRIEF SUMMARY OF THE INVENTION

According to the present invention, there is provided a display device which comprises, on the inner surface of display panel, a red emitting fluorescent film, a green emitting fluorescent film, and a blue emitting fluorescent film, each of the fluorescent films being formed on the inner surface of the display panel, and the display device being featured in that the red emitting fluorescent film contains red fluorescent particles having an average particle diameter ranging from 6 to 12 μm and covered with red pigment having an average particle diameter ranging from $1/100$ to $1/10$ of the average particle diameter of the red fluorescent particles, that the red emitting fluorescent particles is formed of $Y_2O_2S$:Eu, that a concentration of Eu in the red emitting fluorescent particles is 60 ppm or less, and that x-value of luminescent chromaticity of the red emitting fluorescent film is not less than 0.620.

It is preferable in this display device which is constructed as described above that the concentration of Eu in the red emitting fluorescent particles is confined within the range of 40 to 60 ppm, and that the x-value of luminescent chromaticity of the red emitting fluorescent film is not less than 0.630.

Further, according to the present invention, there is provided a display device which comprises a display panel, a light absorption layer, a red emitting fluorescent film, a green emitting fluorescent film, and a blue emitting fluorescent film, each of the fluorescent films being formed on the inner surface of display panel, and the display device being featured in that the red emitting fluorescent film contains red fluorescent particles having an average particle diameter ranging from 6 to 12 μm and covered with red pigment having an average particle diameter ranging from $1/100$ to $1/10$ of the average particle diameter of the red fluorescent particles, that the red emitting fluorescent film particles are formed of $Y_2O_2S$:Eu, that a concentration of Eu in the red emitting fluorescent particles is 20 ppm or less based on a total quantity of the light absorption layer, the red emitting fluorescent film, the green emitting fluorescent film, and the blue emitting fluorescent film and that x-value of luminescent chromaticity of the red emitting fluorescent film is not less than 0.620.

It is preferable that the emission spectrum of the red emitting fluorescent film has peaks of spectrum in a region ranging from 600 nm to 620 nm and in a region ranging from 620 nm to 640 nm, and that the intensity of spectrum in the region ranging from 600 nm to 620 nm is not more than 50 per cent of the intensity of spectrum in the region ranging from 620 nm to 640 nm.

The red pigment to be employed in the display device of the present invention may contain at least one kind of element selected from the group consisting of Fe, Mo and Cd. One preferable example of this red pigment is red iron oxide.

Although the present invention is applicable to various kinds of display devices such as a cathode-ray tube, a plasma display, an electroluminescent display device, etc., it is more preferable to apply it to a color cathode-ray tube.

BRIEF DESCRIPTION OF THE SEVERAL VIEWS OF THE DRAWING

The single FIGURE is a graph illustrating the relationship between the luminescent chromaticity and brightness characteristics, which was obtained by setting the Eu-activating concentration of $Y_2O_2S$:Eu of the red emitting fluorescent film to 45 ppm and to 70 ppm.

DETAILED DESCRIPTION OF THE INVENTION

Next, the display device according to the embodiments of the present invention will be explained in detail with reference to a specific example where the present invention is applied to a color cathode-ray tube.

The red fluorescent substance to be employed in the display device according to an embodiment of the present invention is formed of $Y_2O_2S$:Eu. This $Y_2O_2S$:Eu system fluorescent substance is high in brightness and suited for use as a red fluorescent substance for a color cathode-ray tube.

The concentration of Eu in the $Y_2O_2S$:Eu system fluorescent substance is required to be 60 ppm or less. If the concentration of Eu is higher than 60 ppm, the brightness of the fluorescent substance would be deteriorated. Incidentally, the concentration of Eu in the $Y_2O_2S$:Eu system fluorescent substance to be employed in a color cathode-ray tube is generally in the order of 80 ppm. In the present invention, however, the concentration of Eu is fairly lower than 80 ppm. Specifically, a more preferable concentration of Eu in the $Y_2O_2S$:Eu system fluorescent substance according to the present invention is confined within the range of 40 to 60 ppm.

Incidentally, even if the concentration of Eu is simply limited to not more than 60 ppm, it is impossible to obtain the x-value of 0.620 or more. Whereas, when a red pigment is adhered onto the surface of the $Y_2O_2S$:Eu system fluorescent substance, it is possible to obtain a desired range of the x-value. However, if a red pigment is adhered onto the surface of the $Y_2O_2S$:Eu system fluorescent substance, there will be raised the problem that the emission brightness would be deteriorated.

It has been discovered in the present invention as explained hereinafter that it is possible to enhance not only the luminescent chromaticity but also the emission brightness by limiting, to a specific range, not only an average particle diameter of the $Y_2O_2S$:Eu system fluorescent substance but also a ratio, with regard to average particle diameter, between the fluorescent substance and the pigment.

Namely, an average particle diameter of the $Y_2O_2S$:Eu system fluorescent substance should preferably be confined within the range of 6 to 12 μm. If an average particle diameter of the $Y_2O_2S$:Eu system fluorescent substance is less than 6 μm, the quantity of red pigment covering the surface of the fluorescent substance would become too little, so that it would be difficult to obtain satisfactory luminescent chromaticity. On the other hand, if an average particle diameter of the $Y_2O_2S$:Eu system fluorescent substance is larger than 12 μm, the quantity of red pigment covering the surface of the fluorescent substance would become excessive, so that the deterioration of emission brightness would be easily caused to occur.

In the application of the present invention to a color cathode-ray tube, a red emitting fluorescent film, a green emitting fluorescent film, a blue emitting fluorescent film and a black stripe film are formed on the inner surface of the display panel. In this case, the concentration of Eu should preferably be not more than 20 ppm, more preferably within the range of 10 to 20 ppm based on a total weight of these films. The reason for defining the concentration of Eu in this manner is the easiness in measuring the concentration of Eu on the basis of the entire fluorescent screen rather than on the basis of the fluorescent substance.

The surface of particles of the red fluorescent substance to be employed in the display device according to one embodiment of the present invention is covered with a red pigment. As for specific examples of the red pigment which can be employed in the present invention, it is possible to employ a material which includes at least one kind of element selected from the group consisting of Fe, Mo and Cd, a preferable example thereof being a material containing Fe such for example as $Fe_2O_3$. The α-form of $Fe_2O_3$ is known as red iron oxide.

An average particle diameter of the red pigment to be employed herein should preferably be 1/100 to 1/10 of the average particle diameter of the red fluorescent particles. If an average particle diameter of the red pigment is less than 1/100 of the average particle diameter of the red fluorescent particles, the particle size of red pigment would become too fine to easily handle the red pigment. On the other hand, if an average particle diameter of the red pigment is larger than 1/10 of the average particle diameter of the red fluorescent particles, the absorbance of incident light directed to the pigment would become too large, thus decreasing the emission brightness.

As far as an average particle diameter of the red pigment is confined within the range of 1/100 to 1/10 of the average particle diameter of the red fluorescent particles, it is possible to secure not only a sufficient luminescent chromaticity but also a sufficient emission brightness even if the concentration of Eu in the red fluorescent substance is 60 ppm or less.

Incidentally, an average particle diameter of the red pigment should preferably be 0.2 μm or less, more preferably within the range of 0.05 to 0.15 μm.

The quantity of the red pigment covering the surface of the red fluorescent particles changes depending on the concentration of Eu, it is difficult to unequivocally determine this quantity of the red pigment. However, if this quantity of the red pigment is too large, the brightness of the display is caused to decrease, while if this quantity of the red pigment is too little, it would be impossible to obtain an effect of enhancing the contrast of the display. By covering the surface of the red fluorescent particles with a red pigment, the x-value of luminescent chromaticity of the red fluorescent particles can be increased. This x-value according to the present invention is required to be 0.620 or more. Therefore, the quantity of the red pigment covering the surface of the red fluorescent particles should be such that is sufficient enough to obtain the x-value which is not less than 0.620. Incidentally, a preferable range of this x-value is 0.630 or more.

Generally, the emission spectrum of the red fluorescent particles has a peak of spectrum in a region ranging from 600 nm to 620 nm and also in region ranging from 620 nm to 640 nm. However, when the surface of the red fluorescent particles is covered with a red pigment, the emission spectrum of the red fluorescent particles would become such that the height of the peak in the region ranging from 600 nm to 620 nm is caused to decrease while the height of the peak in the region ranging from 620 nm to 640 nm is caused to increase, thus resulting in an increase of this x-value.

According to the present invention, the intensity of spectrum in the region ranging from 600 nm to 620 nm is confined to not more than 50 per cent of the intensity of spectrum in the region ranging from 620 nm to 640 nm, thereby obtaining the x-value which is not less than 620. Incidentally, the intensity of spectrum in the region ranging from 600 nm to 620 nm should preferably be 40 or less.

As for the method of covering the surface of the red fluorescent particles with a red pigment in the present invention, there is not any particular limitation. For example, it is possible to easily cover the surface of the red fluorescent particles with a red pigment by a process wherein the red fluorescent particles are added at first to a pigment dispersion containing the pigment and a dispersing agent, the resultant dispersion being subsequently allowed to dry.

EXAMPLES

Next, the present invention will be more specifically explained with reference to the following examples of the present invention.

Example 1

Only a red emitting fluorescent substance layer was deposited on the inner surface of glass panel of a color cathode-ray tube by means of an ordinary slurry method. A slurry of the fluorescent substance in this case was prepared by mixing together the fluorescent substance, a surfactant and pure water.

As for the red emitting fluorescent substance, there were employed various kinds of samples all basically comprising a $Y_2O_2S$:Eu fluorescent substance having an average particle diameter of 7.5 μm, and red iron oxide having an average particle diameter of 0.10 μm and covering the surface of particles of the $Y_2O_2S$:Eu fluorescent substance, wherein the concentration of Eu of the $Y_2O_2S$:Eu fluorescent substance was varied to 45 ppm and 70 ppm, and the weight ratio of the red iron oxide was also varied to 0.1 wt %, 0.2 wt %, 0.3 wt % and 0.4 wt %.

By making use of the panels having these fluorescent substances formed thereon, cathode-ray tubes were manufactured by way of the method which is generally employed in the manufacture of a color cathode-ray tube. Then, the brightness and luminescent chromaticity of these cathode-ray tubes were measured, the results being illustrated in FIGURE.

FIGURE illustrates the relationship between the luminescent chromaticity and brightness characteristics, wherein the Eu-activating concentration of the red emitting fluorescent substance $Y_2O_2S$:Eu was set to 45 ppm and to 70 ppm.

Incidentally, the brightness and luminescent chromaticity of these cathode-ray tubes were measured using an MCPD 2000 (trade mark, Ohtsuka Denshi Co., Ltd.). As for the external reflection, it was measured in comparison with that of a standard white reflecting plate by making use of a BM-5A (Topcon Co., Ltd.).

It will be seen from the characteristic curves shown in FIG. 1 that as the concentration of Eu was increased, while the brightness characteristics of the cathode-ray tube was caused to correspondingly deteriorate, the luminescent chromaticity thereof could be enhanced. As for the quantity of the pigment covering the fluorescent particles, as this quantity of the pigment was increased, the brightness characteristics were caused to correspondingly deteriorate, while correspondingly enhancing the emission brightness.

Since the darkness of the cathode-ray tube when the fluorescent substance was not emitted could be enhanced by the pigment covering the fluorescent particles, it was possible, by lowering the activating concentration of Eu and also by increasing the quantity of the pigment covering the fluorescent particles, to improve the level of darkness of the red fluorescent substance, thus resulting in enhancement of the contrast of the cathode-ray tube.

As explained above, it was possible, by covering the surface of red fluorescent particles with a red pigment and at the same time, by lowering the activating concentration of Eu to 60 ppm or less, to obtain a cathode-ray tube having desired brightness and luminescent chromaticity and being excellent in contrast.

Example 2

As a black stripe, a light absorption layer having a predetermined pattern was deposited at first, by way of a known method, on the inner surface of glass panel of a color cathode-ray tube. More specifically, a photoresist layer was formed on the inner surface of the panel and then, the photoresist layer was subjected, through a shadow mask, to an exposure process, which was then followed by development and drying, thereby permitting a photo-cured film having a stripe-like pattern to leave on a predetermined region for forming a fluorescent substance layer. Then, a light absorption substance such as graphite was coated all over the surface, after which an acid such as an aqueous solution of hydrogen peroxide was coated thereon to dissolve the photo-cured film. Thereafter, by means of high-pressure water, the light absorption substance deposited on the photo-cured film was removed to form a black stripe layer, while permitting to expose the aforementioned predetermined region for forming a fluorescent substance layer.

Subsequently, by means of an ordinary slurry method, a blue emitting fluorescent substance layer, a green emitting fluorescent substance layer and a red emitting fluorescent substance layer were respectively and successively deposited on the inner surface of glass panel having the light absorption layer formed in advance as described above. A slurry of the fluorescent substance employed herein was prepared by mixing together the fluorescent substance, a surfactant and pure water.

As for the red emitting fluorescent substance, there were employed various kinds of samples all basically comprising a $Y_2O_2S$:Eu fluorescent substance having an average particle diameter of 9.5 μm, and red iron oxide having an average particle diameter of 0.15 μm and covering the surface of particles of the $Y_2O_2S$:Eu fluorescent substance, wherein the concentration of Eu of the $Y_2O_2S$:Eu fluorescent substance was varied to 80 ppm, 60 ppm and 40 ppm, and the weight ratio of the red iron oxide was also varied to 0.1 wt %, 0.2 wt % and 0.3 wt %. As for the blue emitting fluorescent substance, ZnS:Ag,Al was employed. As for the green emitting fluorescent substance, ZnS:Cu,Al was employed.

As a result, it was possible to obtain various kinds of phosphorous planes each having a predetermined pattern including a black stripe and fluorescent layers of various colors formed on the inner surface of panel.

By making use of the panels having these fluorescent substances formed thereon, cathode-ray tubes were manufactured by way of the method which is generally employed in the manufacture of a color cathode-ray tube. Then, the brightness, luminescent chromaticity, the reflectance of the external light, and the value of the peak of emission spectrum in the region ranging from 600 nm to 620 nm in comparison with the value of the peak (which was assumed as 100) of emission spectrum in the region ranging from 620 nm to 640 nm were measured, the results being illustrated in the following Table 1.

It will be seen from Table 1 that when the Eu activating quantity was limited to not more than 60 ppm and the luminescent chromaticity was set to 0.620 or more, it was possible, irrespective of the quantity of adhered pigment, to control the brightness to not less than 13.0 cd/cm$^2$ and at the same time, to control the reflectance of the external light to 3.5% or less, thus indicating an excellent contrast of the cathode-ray tube. It will be also seen from Table 1 that in all of these fluorescent substances, the value of the peak of emission spectrum in the region ranging from 600 nm to 620 nm was not more than 50 in comparison with the value of the peak of emission spectrum in the region ranging from 620 nm to 640 nm which was assumed as being 100.

Example 3

Only a red emitting fluorescent substance layer was deposited on the inner surface of glass panel of a color cathode-ray tube by means of an ordinary slurry method. A slurry of the fluorescent substance in this case was prepared by mixing together the fluorescent substance, a surfactant and pure water.

As for the red emitting fluorescent substance, there were employed various kinds of samples all basically comprising a $Y_2O_2S$:Eu fluorescent substance having an Eu concentration of 60 ppm, and 0.2 wt % of red iron oxide covering the surface of particles of the $Y_2O_2S$:Eu fluorescent substance, wherein the average particle diameter of the fluorescent substance was varied to 5 μm, 6 μm, 10 μm, 12 μm and 13 μm, and the average particle diameter of the red iron oxide was also varied to 0.05 μm, 0.06 μm, 0.10 μm, 0.12 μm and 0.15 μm.

By making use of the panels having these fluorescent substances formed thereon, cathode-ray tubes were manufactured by way of the method which is generally employed in the manufacture of a color cathode-ray tube. Then, the brightness and luminescent chromaticity of these cathode-ray tubes were measured, the results being illustrated in the following Table 2.

TABLE 1

(Differences in characteristics due to Eu activating quantity of $YO_2S$:Eu fluorescent substance and to the quantity of pigment covering the fluorescent substance)

| Eu-activating quantity | Quantity of pigment | Brightness cd/cm$^2$ | Luminescent chromaticity x | Emission spectrum % | External light reflectance |
|---|---|---|---|---|---|
| 40 ppm | 0.1 wt% | 17.2 | 0.609 | 60 | 3.6% |
| | 0.2 wt% | 16.0 | 0.613 | 55 | 3.3% |
| | 0.3 wt% | 15.1 | 0.623 | 50 | 2.9% |
| 60 ppm | 0.1 wt% | 15.0 | 0.625 | 50 | 3.5% |
| | 0.2 wt% | 13.8 | 0.630 | 45 | 3.3% |
| | 0.3 wt% | 13.0 | 0.635 | 40 | 2.9% |
| 80 ppm | 0.1 wt% | 11.0 | 0.630 | 45 | 3.7% |
| | 0.2 wt% | 10.1 | 0.634 | 40 | 3.4% |
| | 0.3 wt% | 8.7 | 0.638 | 35 | 3.0% |

TABLE 2

(Differences in characteristics due to differences in average particle diameter of the fluorescent substance and to differences in particle diameter of pigment)

| Average diameter of fluorescent substance | | Average diameter of pigment | | | | | |
|---|---|---|---|---|---|---|---|
| | | 0.05 μm | 0.06 μm | 0.10 μm | 0.60 μm | 1.2 μm | 1.5 μm |
| 5 μm | Ratio of particle size | 1/100 | 1.2/100 | 2/100 | 12/100 | 24/100 | 3/10 |
| | Brightness | 10.0 | 10.1 | 10.5 | 9.2 | 9.0 | 8.5 |
| | Luminescent chromaticity x | 0.616 | 0.621 | 0.627 | 0.629 | 0.633 | 0.635 |
| 6 μm | Ratio of particle size | 1/120 | 1/100 | 1/60 | 1/10 | 2/10 | 4/10 |
| | Brightness | 12.0 | 13.1 | 13.5 | 13.0 | 10.1 | 9.2 |
| | Luminescent chromaticity x | 0.617 | 0.622 | 0.624 | 0.628 | 0.630 | 0.632 |
| 10 μm | Ratio of particle size | 1/200 | 3/500 | 1/100 | 6/100 | 12/100 | 15/100 |
| | Brightness | 12.1 | 12.5 | 13.8 | 14.8 | 11.3 | 10.0 |
| | Luminescent chromaticity x | 0.616 | 0.628 | 0.630 | 0.629 | 0.630 | 0.632 |
| 12 μm | Ratio of particle size | 1/240 | 1/200 | 1/120 | 5/100 | 1/10 | 1/8 |
| | Brightness | 12.5 | 12.9 | 13.7 | 12.8 | 11.4 | 10.5 |
| | Luminescent chromaticity x | 0.617 | 0.623 | 0.624 | 0.628 | 0.630 | 0.633 |
| 13 μm | Ratio of particle size | 1/260 | 3/650 | 1/130 | 6/130 | 12/130 | 15/130 |
| | Brightness | 12.0 | 12.3 | 12.8 | 12.1 | 10.8 | 10.1 |
| | Luminescent chromaticity x | 0.616 | 0.622 | 0.625 | 0.626 | 0.630 | 0.631 |

It will be seen from Table 2 that when the average particle diameter of the fluorescent substance was confined within the range of 6 μm to 12 μm, it was possible to realize a high degree of brightness which may exceed over 13.0. Further, it will be also seen Table 2 that the larger the average particle diameter of the pigment was, the more excellent the luminescent chromaticity would become, and that when the average particle diameter of the pigment was set to range from 1/100 to 1/10 of the average particle diameter of the fluorescent particles, it was possible to obtain an improved brightness.

Incidentally, in the foregoing examples, although the present invention has been explained with reference to a color cathode-ray tube, it should be noted that the present invention is also applicable, in addition to the cathode-ray tube, to various kinds of display devices where a fluorescent substance is employed such as a plasma display panel (PDP), an electroluminescent display device, etc.

As explained above in detail, according to the present invention, since $Y_2O_2S$:Eu system fluorescent particles having a red pigment covered on the surface thereof is employed as a red emitting fluorescent substance and at the same time, the Eu activating quantity and the luminescent chromaticity are respectively limited within a predetermined range, it is now possible, by making use of the same manufacturing process as conventionally employed, to provide a display device which is improved in contrast while securing a desired luminance brightness of the fluorescent substance.

What is claimed is:

1. A display device which comprises a display panel, a red emitting fluorescent film, a green emitting fluorescent film, and a blue emitting fluorescent film, each of said fluorescent films being formed on an inner surface of said display panel;

wherein the red emitting fluorescent film contains red fluorescent particles having an average particle diameter ranging from 6 to 12 μm and covered with red pigment having an average particle diameter ranging from 1/100 to 1/10 of the average particle diameter of the red fluorescent particles; the red emitting fluorescent particles are formed of $Y_2O_2S$:Eu; a concentration of Eu in the red emitting fluorescent particles is 60 ppm or less; and the x-value of luminescent chromaticity of the red emitting fluorescent film is not less than 0.620.

2. The display device according to claim 1, wherein the concentration of Eu in the red emitting fluorescent particles is confined within the range of 40 to 60 ppm.

3. The display device according to claim 1, wherein the emission spectrum of the red emitting fluorescent film has peaks of spectrum in a region ranging from 600 nm to 620 nm and in a region ranging from 620 nm to 640 nm, the intensity of spectrum in the region ranging from 600 nm to 620 nm being not more than 50 per cent of the intensity of spectrum in the region ranging from 620 nm to 640 nm.

4. The display device according to claim 1, wherein the red pigment contains at least one kind of element selected from the group consisting of Fe, Mo and Cd.

5. The display device according to claim 1, wherein the red pigment is red iron oxide.

6. The display device according to claim 5, wherein said display device is a color cathode-ray tube.

7. A display device which comprises, a display panel, a light absorption layer, a red emitting fluorescent film, a green emitting fluorescent film, and a blue emitting fluorescent film, each of said fluorescent films being formed on an inner surface of said display panel;

wherein the red emitting fluorescent film contains red fluorescent particles having an average particle diameter ranging from 6 to 12 μm and covered with red pigment having an average particle diameter ranging from 1/100 to 1/10 of the average particle diameter of the red fluorescent particles; the red emitting fluorescent particles are formed of $Y_2O_2S$:Eu; a concentration of Eu in the red emitting fluorescent particles is 20 ppm or less based on a total quantity of the light absorption layer, the red emitting fluorescent film, the green emitting fluorescent film and the blue emitting fluorescent film; and the x-value of luminescent chromaticity of the red emitting fluorescent film is not less than 0.620.

8. The display device according to claim 7, wherein the emission spectrum of the red emitting fluorescent film has peaks of spectrum in a region ranging from 600 nm to 620 nm and in a region ranging from 620 nm to 640 nm, the intensity of spectrum in the region ranging from 600 nm to 620 nm being not more than 50 per cent of the intensity of spectrum in the region ranging from 620 nm to 640 nm.

9. The display device according to claim 7, wherein the red pigment contains at least one kind of element selected from the group consisting of Fe, Mo and Cd.

10. The display device according to claim 7, wherein the red pigment is red iron oxide.

11. The display device according to claim 10, wherein said display device is a color cathode-ray tube.

* * * * *